United States Patent
Oddsen, Jr.

(10) Patent No.: US 6,783,105 B2
(45) Date of Patent: Aug. 31, 2004

(54) ADJUSTABLE DISPLAY ARM FOR COMPUTER COMPONENTS

(75) Inventor: Odd N. Oddsen, Jr., Easton, PA (US)

(73) Assignee: Innovative Office Products, Inc., Easton, PA (US)

(*) Notice: Subject to any disclaimer, the term of this patent is extended or adjusted under 35 U.S.C. 154(b) by 0 days.

(21) Appl. No.: 10/175,592

(22) Filed: Jun. 19, 2002

(65) Prior Publication Data

US 2003/0116687 A1 Jun. 26, 2003

Related U.S. Application Data

(60) Provisional application No. 60/299,522, filed on Jun. 20, 2001.

(51) Int. Cl.$^7$ ................................................ E04G 3/00
(52) U.S. Cl. .................................... 248/279.1; 248/919
(58) Field of Search ..................... 248/279.1, 279.11, 248/330.1, 331, 333, 245.11, 919, 280.11

(56) References Cited

U.S. PATENT DOCUMENTS

| | | | |
|---|---|---|---|
| 2,580,980 A | | 1/1952 | Vrooman |
| 3,822,848 A | * | 7/1974 | Hopkins .................. 248/279.1 |
| 3,862,734 A | * | 1/1975 | Buchin et al. ........... 248/125.2 |
| 3,885,764 A | | 5/1975 | Pabreza |
| 4,447,031 A | | 5/1984 | Souder, Jr. et al. |
| 4,516,751 A | * | 5/1985 | Westbrook ............... 248/279.1 |
| 4,774,961 A | * | 10/1988 | Carr ............................ 600/549 |
| 4,836,478 A | * | 6/1989 | Sweere .................... 248/279.1 |
| 4,964,606 A | | 10/1990 | Beam et al. |
| 5,007,608 A | * | 4/1991 | Carroll, Jr. ............. 248/297.21 |
| 5,099,768 A | | 3/1992 | Kirchner |
| 5,127,617 A | | 7/1992 | Bergetz |
| 5,183,162 A | * | 2/1993 | Ritzenthaler ............... 211/1.57 |
| 5,240,215 A | * | 8/1993 | Moore ..................... 248/279.1 |
| 5,240,218 A | * | 8/1993 | Dye ........................ 248/330.1 |
| 5,405,117 A | | 4/1995 | Davis |
| 5,779,216 A | | 7/1998 | Grace et al. |
| 5,797,568 A | | 8/1998 | Canton Gongora et al. |
| 5,876,008 A | | 3/1999 | Sweere et al. |
| 6,189,849 B1 | * | 2/2001 | Sweere et al. ........... 248/286.1 |
| 6,286,794 B1 | * | 9/2001 | Harbin .................... 248/123.2 |

* cited by examiner

*Primary Examiner*—Leslie A. Braun
*Assistant Examiner*—A. Joseph Wujciak
(74) *Attorney, Agent, or Firm*—Lerner, David, Littenberg, Krumholz & Mentlik, LLP

(57) ABSTRACT

An adjustable display arm includes a telescoping assembly for positioning an electronic component in a plurality of vertical positions. The adjustable display arm is maintained in a plurality of vertical positions in the absence of upward or downward forces applied thereto by a counterbalancing assembly. Further, the adjustable display arm can be releasably locked in any one of a plurality of vertical positions using a locking assembly.

23 Claims, 23 Drawing Sheets

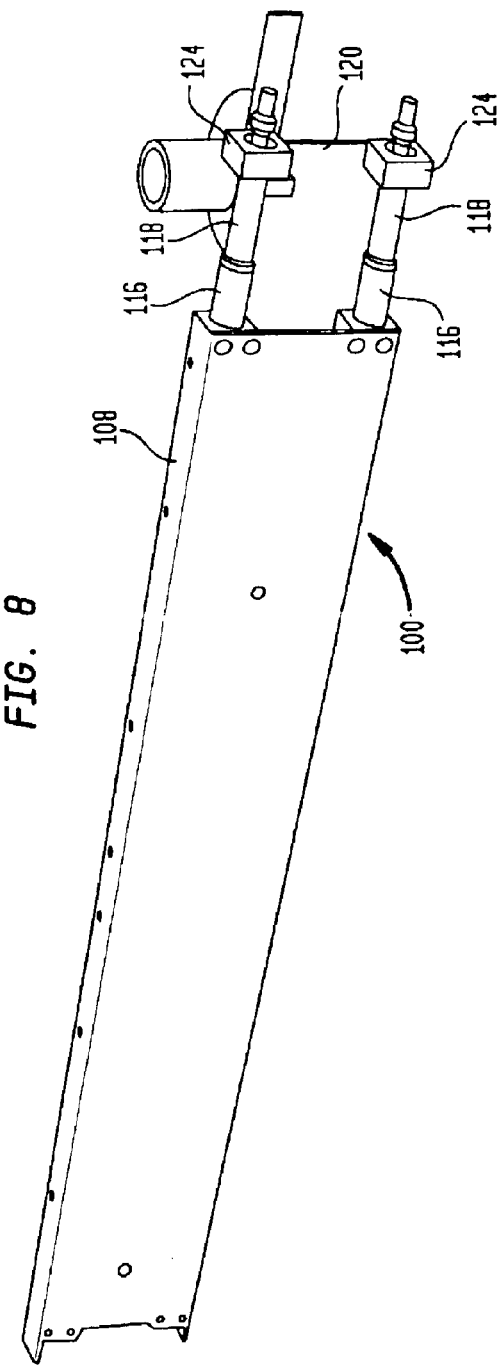
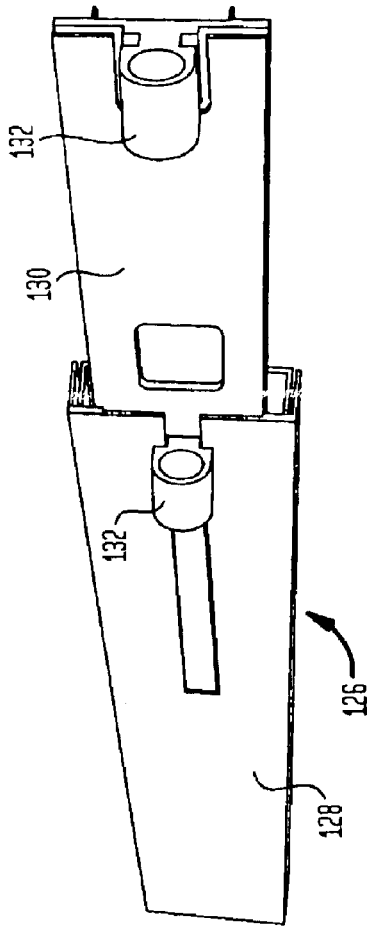

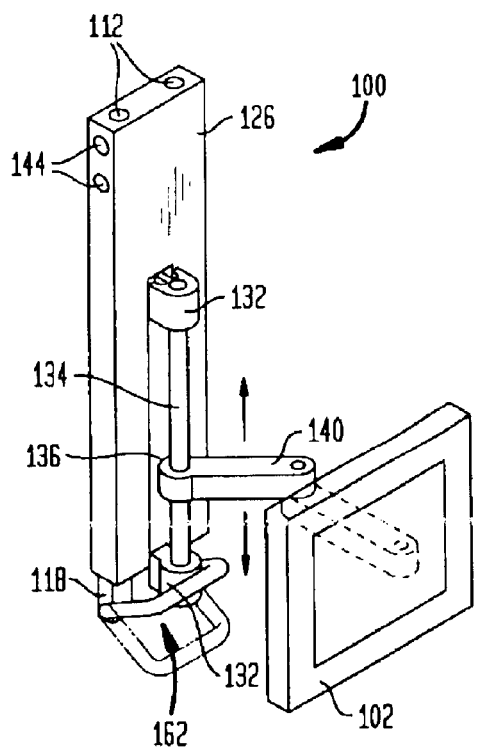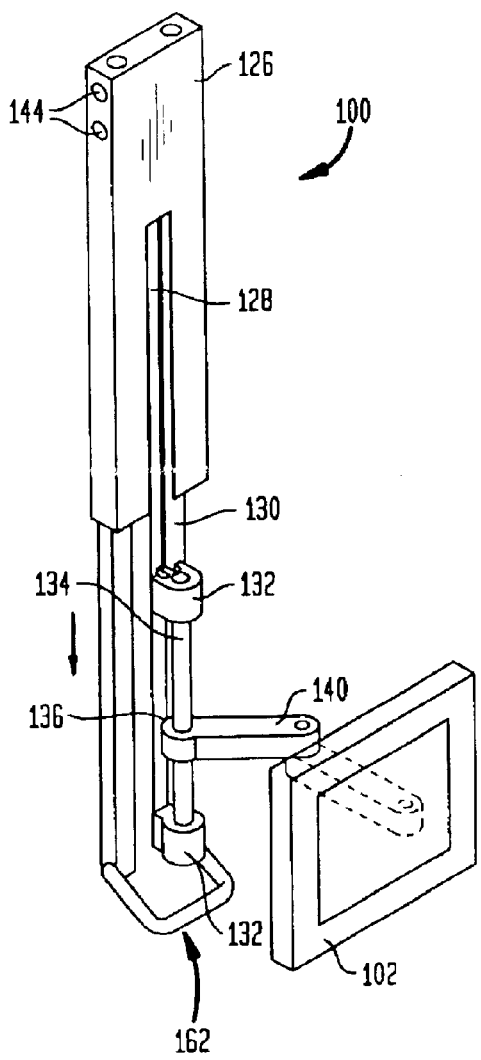

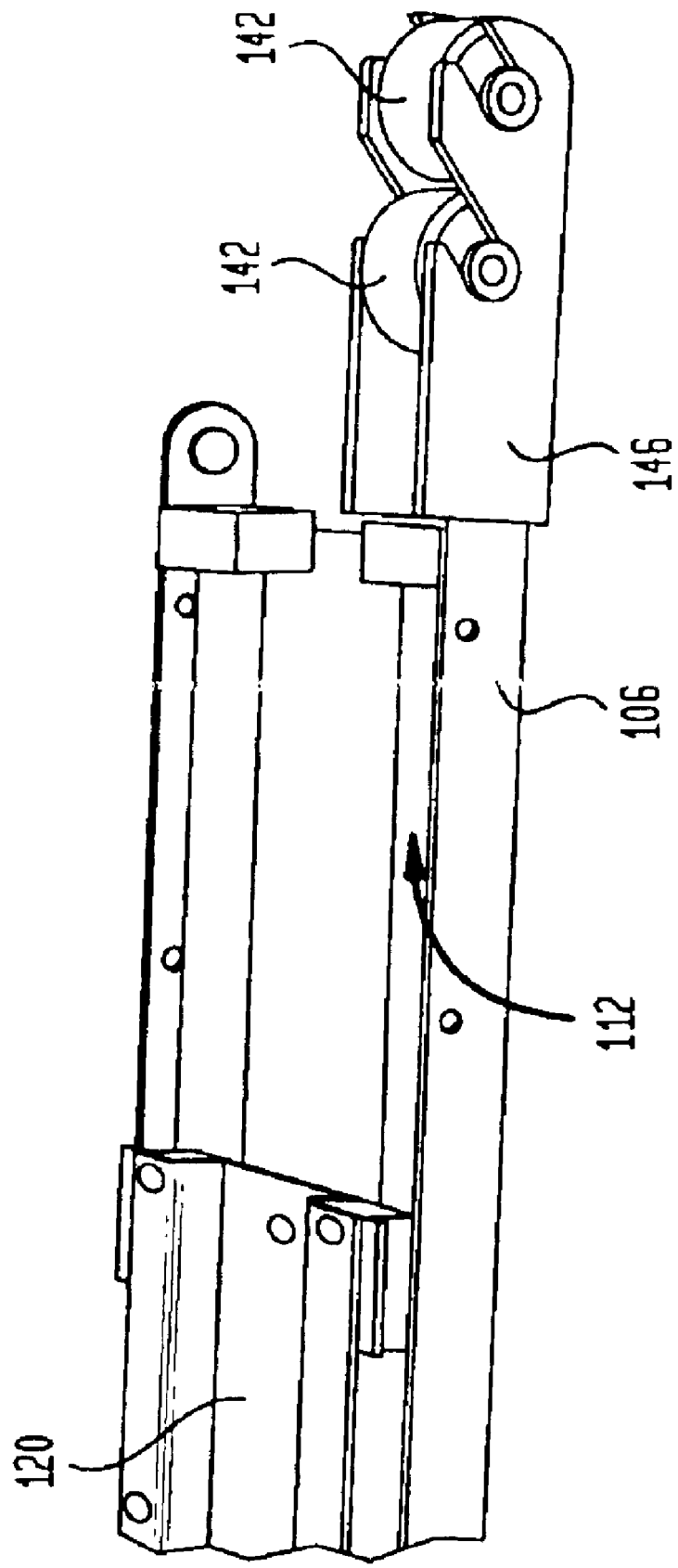

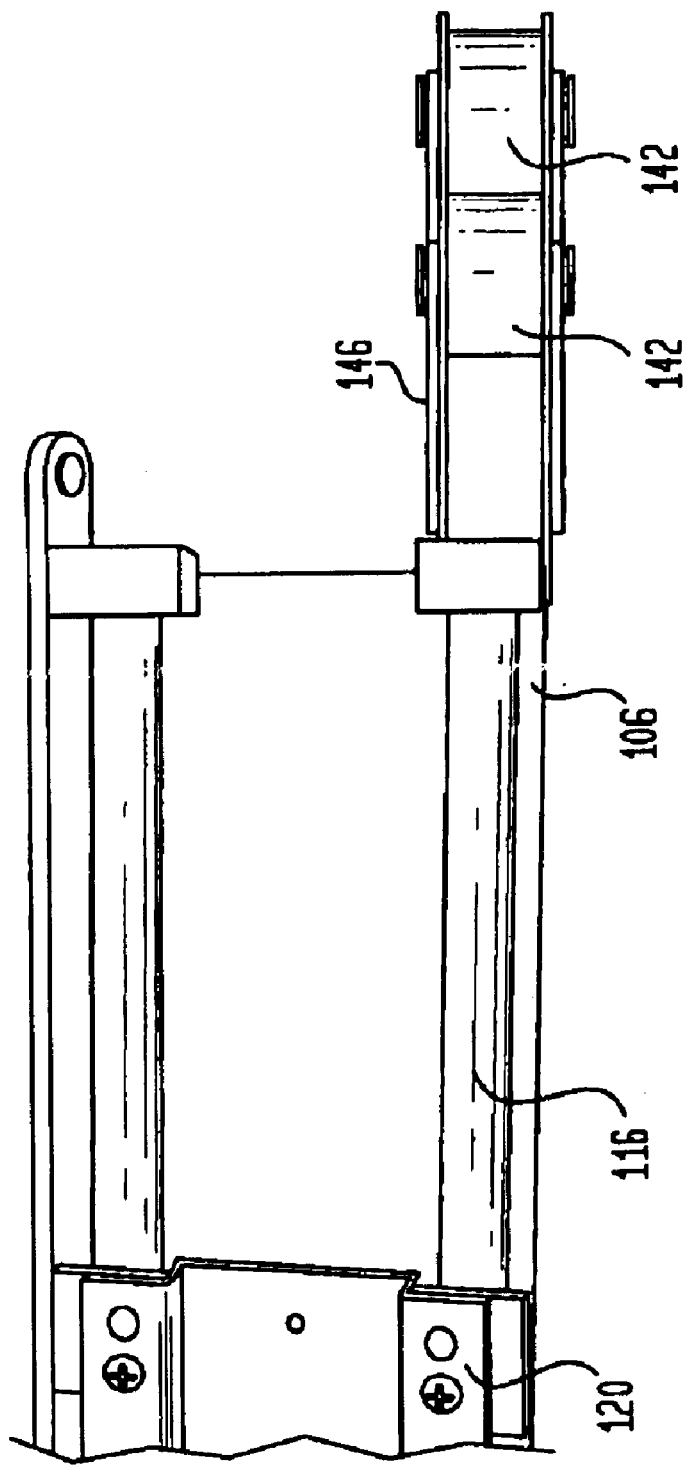

FIG. 23
FIG. 24
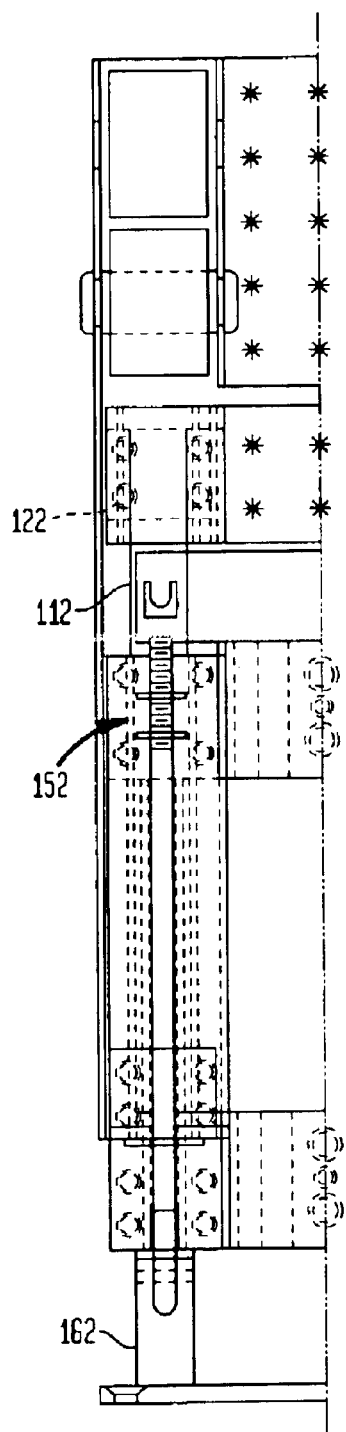
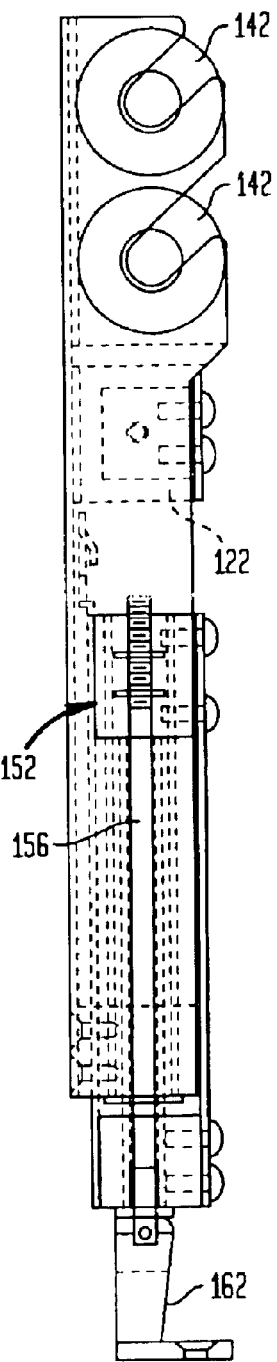

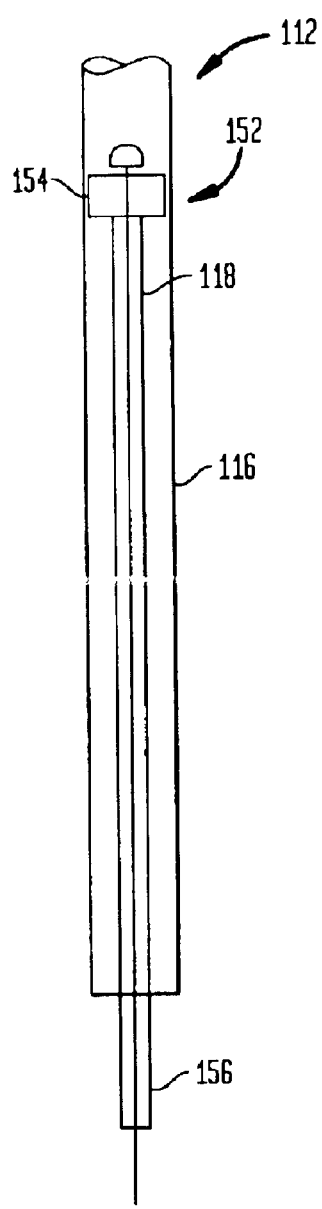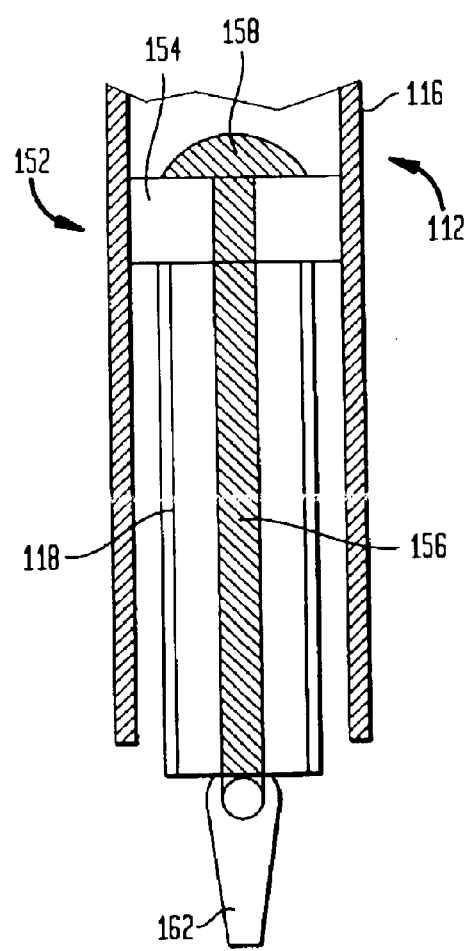

ADJUSTABLE DISPLAY ARM FOR COMPUTER COMPONENTS

CROSS-REFERENCE TO RELATED APPLICATIONS

The present application claims the benefit of U.S. Provisional Application No. 60/299,522, filed Jun. 20, 2001, the disclosure of which is hereby incorporated by reference herein.

BACKGROUND OF THE INVENTION

The present invention relates in general to the field of display arms, and more particularly, to adjustable display arms for computer components such as computer monitors, keyboards, and the like.

There are many different devices relating to display arms for electronic components, such as those related to computers. Many times, these devices are employed in order to conserve space. Rather than placing such components directly on a desk or other supporting surface, display arms are used to keep the components elevated from the surface. These display arms are generally attached to the surface or an adjacent surface and are generally fixed in one or more positions by anchors or the like. These devices can save desktop space, but still render an otherwise vacant area occupied with the electronic components, as well as the display arm.

In many instances, there is not a surface but rather a wide-open area for which to conserve space, or in which to use a display arm. A generally unemployed area within a given space is that above head-level. Storage devices that could utilize this area allow for components to be stored out of the way while conserving floor space and other space, which can be populated by other materials. Televisions that utilize a remote control are perfect examples of something that can be stored in this fashion. Sporadically used computer components are another. U.S. Pat. No. 5,127,617 to Bergetz teaches a swivel mounting device for televisions and the like. This device allows for a television to be supported from the ceiling, but does not allow for the television to be adjusted in the vertical direction. While this will still allow for the use of a television through a remote control, computer components and other on hands devices could not be used with this device.

U.S. Pat. No. 5,797,568 to Canton Gongora et al. and U.S. Pat. No. 4,964,606 to Beam et al. allow for vertical adjustment in a monitor-supporting device. However, this adjustment can only be done in fixed intervals. In order to perform the vertical adjustment as taught in these patents, the weight of the components must constantly be supported, an anchoring device must be removed, the components must be raised or lowered into position, and the anchoring device must be replaced. This can amount to something that might have to be done by two or more persons.

The present invention is directed to a display arm that can be raised and lowered with minimal exertion while supporting an electronic device. The display arm of the present invention allows computer components and the like, that may be used intermittently, to be stored at an elevated level while being made accessible at a lower level for ease of use.

SUMMARY OF THE INVENTION

An adjustable display arm is described in accordance with one embodiment for positioning an electronic component in a plurality of vertical positions. The display arm includes a mounting portion adapted to be supported in a vertical orientation and a sliding arm moveably mounted to the mounting portion for movement in a vertical direction between a plurality of vertical positions. The sliding arm is moveable in an upward direction upon application of an upward force thereto and in a downward direction upon application of a downward force thereto. The sliding arm is maintained in a plurality of vertical positions in the absence of either an upward force or a downward force.

An adjustable display arm is described in accordance with another embodiment for positioning an electronic component in a plurality of vertical positions. The display arm includes a mounting portion adapted to be supported in a vertical orientation, a sliding arm moveably mounted to the mounting portion for movement in a vertical direction between a plurality of vertical positions, the sliding arm moveable in an upward direction upon application of an upward force thereto and in a downward direction upon application of a downward force thereto, a counterbalancing assembly operative to maintain the sliding arm in a plurality of vertical positions in the absence of either the upward force or the downward force, and a locking mechanism for releasably holding the sliding arm in any of a plurality of vertical positions.

An adjustable display arm is described in accordance with another embodiment for positioning an electronic component in a plurality of vertical positions. The display arm includes a mounting device adapted to be supported in a vertical orientation, a sliding arm having first and second opposing ends moveably mounted to the mounting device for movement in a vertical direction between a plurality of vertical positions, the sliding arm moveable in an upward direction upon application of an upward force thereto and in a downward direction upon application of downward force thereto, first and second spaced apart telescopic assemblies attached to the mounting device, each of the telescopic assemblies including a first elongated tubular member telescopically received within a second elongated tubular member, the second elongated tubular member being attached to the mounting portion and the first elongated tubular member being attached to the sliding arm, the first elongated tubular member being fixedly attached to the first end of the sliding arm, the second end of said sliding arm being slidingly coupled to the second elongated tubular member, a counterbalancing assembly, operative to maintain the sliding arm in a plurality of vertical positions in the absence of either an upward force or a downward force, the counterbalancing assembly including a coiled spring having a spring force, the spring being connected at one end to the mounting device and at another end to the sliding arm, a locking mechanism for releasably securing the sliding arm in any of a plurality of vertical positions including a ring of compressible elastomeric material within the second elongated tubular member, an elongated rod secured to the ring extending through the first elongated tubular member, and a handle attached to the rod at one end thereof for applying a compressive force to the ring by manipulation of the rod downwardly within the first elongated tubular member, wherein application of the force to the rod causes the ring to compress in a first direction and expand in a second direction perpendicular to the first direction thereby compressing against the second elongated tubular member and preventing movement of the sliding arm, and an attachment adapted to movably secure a computer monitor and a computer keyboard to the sliding arm, wherein the attachment includes a cylindrical member having opposite ends connected to a respective one of a pair of spaced apart brackets attached to the sliding arm, wherein the computer monitor and the computer keyboard are attachable to the cylindrical member.

A method is described of positioning an electronic component in a plurality of vertical positions including supporting a mounting device in a vertical orientation, movably coupling a sliding arm to the mounting device for movement in a vertical direction between a plurality of vertical positions, the sliding arm moveable in an upward direction upon application of an upward force thereto and in a downward direction upon application of a downward force thereto, and maintaining the sliding arm in a plurality of vertical positions in the absence of either the upward force or the downward force.

A method of positioning an electronic component in a plurality of vertical positions, the method includes supporting a mounting device in a vertical orientation; attaching a pair of spaced apart telescopically assemblies to the mounting device; movably coupling a sliding arm to the telescopically assemblies for movement in a vertical direction between a plurality of vertical positions coupling a counterbalance assembly between the mounting device and the sliding arm for maintaining the sliding arm in the plurality of vertical positions, wherein the sliding arm is moveable in an upward direction upon application of an upward force thereto in and in a downward direction upon application of a downward force thereto; and releasably locking the sliding arm in a plurality of vertical positions.

A locking assembly for a pair of telescopically arranged first and second elongated tubular members, the first elongated tubular member telescopically received within a second elongated tubular member. The locking assembly including a body of compressible elastomeric material within the second elongated tubular member, an elongated rod having one end secured to the body extending within the first elongated tubular member, and a handle attached to the other end of the rod for applying a compressive force to the body, wherein application of a force to the rod causes the ring to compress in a first direction and expand in a second direction thereby engaging the second elongated tubular member and preventing movement of the first elongated tubular member.

BRIEF DESCRIPTION OF THE DRAWINGS

The above description, as well as further objects, features and advantages of the present invention will be more fully understood with reference to the following detailed description of an adjustable display arm for computer components, when taken in conjunction with the accompanying drawings, wherein:

FIG. 8 is a rear perspective view of a partially assembled display arm;

FIG. 9 is a front perspective view of the display arm in partial assembly, with the sliding arm in an extended position;

FIG. 13 is a front perspective view of the display arm in complete assembly, with the sliding arm in an extended position;

FIG. 17 is a front perspective view of the spring counterbalancing assembly connected to the display arm;

FIG. 18 is a front view of the spring counterbalancing assembly connected to the display arm;

FIG. 20 is a front perspective view of the display arm in complete assembly, with the sliding arm in a retracted position;

FIG. 23 is a partial front view of the display arm in complete assembly, with a locking mechanism in place;

FIG. 24 is a side view of the display arm in complete assembly, with a locking mechanism in place;

FIG. 25 is a front view of a tube with the locking mechanism in place;

FIG. 26 is a front view of the locking mechanism with an enlarged head securing the rod to the ring;

DETAILED DESCRIPTION OF THE PREFERRED EMBODIMENTS

In describing the preferred embodiments of the subject matter illustrated and to be described with respect to the drawings, specific terminology will be resorted to for the sake of clarity. However, the invention is not intended to be limited to the specific terms so selected and is to be understood that each specific term includes all technical equivalents which operate in a similar manner to accomplish a similar purpose.

Figure 1:
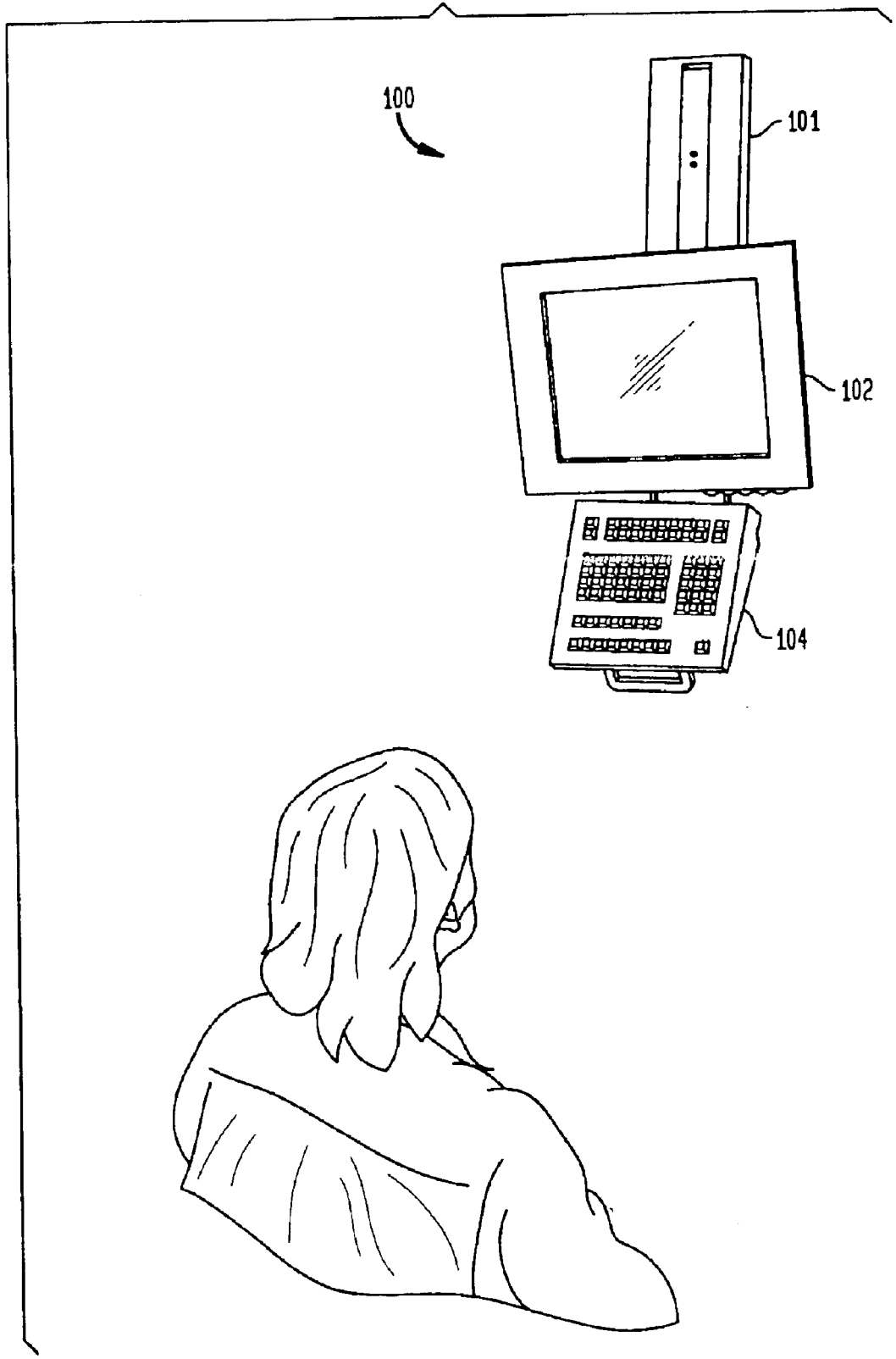
FIG. 1 is a front view depicting a user and the display arm in its highest vertical position.

The display arm of the present invention is particularly suited for supporting, in combination, a computer monitor such as a CRT or LCD display, along with an input device such as a keyboard, or other electronic component. The display arm is particularly suitable for mounting at an elevated location where the supported components will not interfere with the work area such as shown in FIG. 1. The display arm 100 is mountable at an elevated location to a supporting wall generally above the height of a user. The display arm 100 has a mounting portion 101 and a sliding arm 103. As shown, the display arm 100 supports by way of example an LCD monitor 102 and a keyboard 104. The monitor 102 and keyboard 104 are initially arranged at an elevation which is outside the general work area, and therefore, does not interfere with personnel movement.

Figure 2:
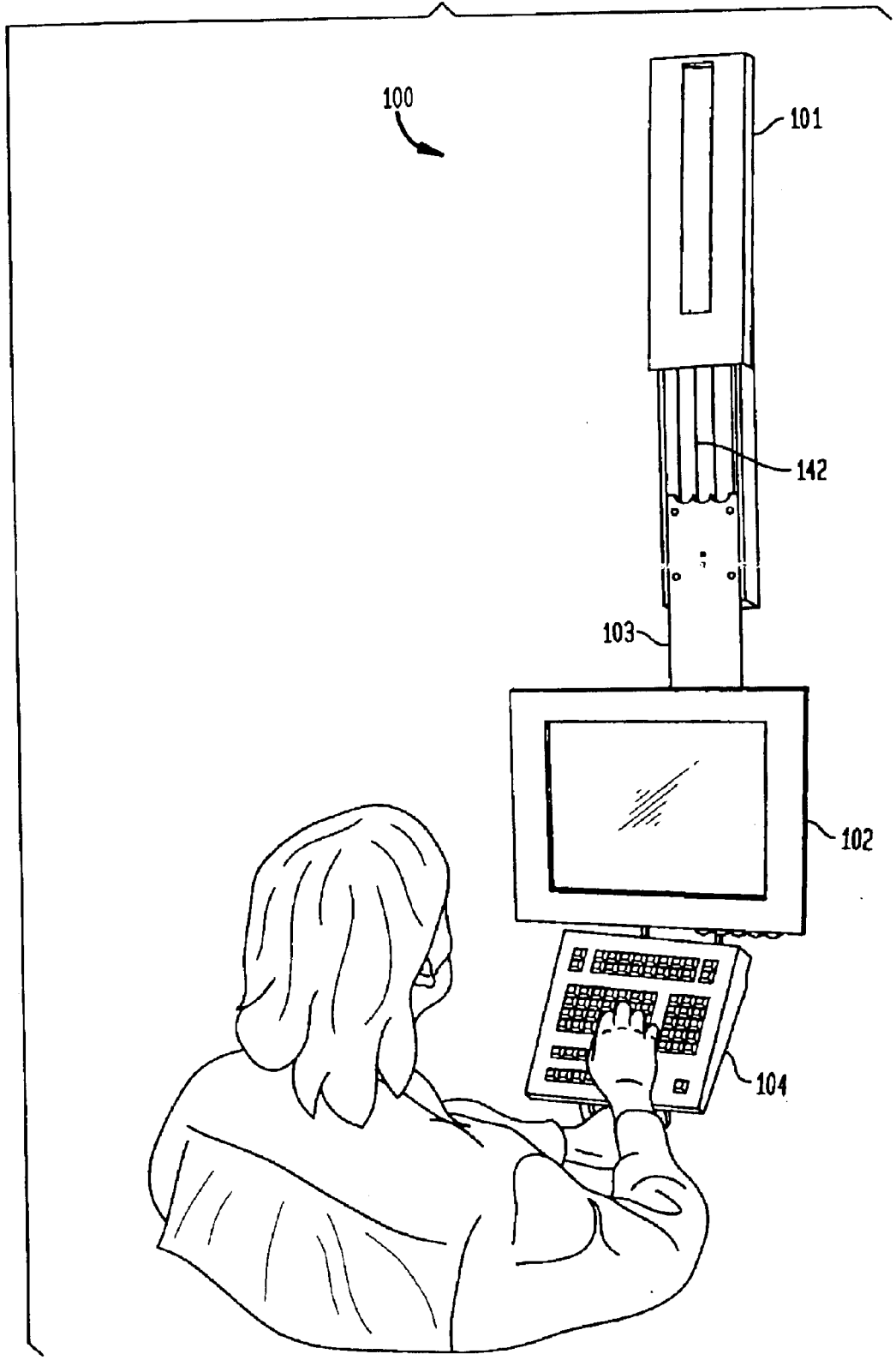
FIG. 2 is a front view depicting a user and the display arm in a position where a user is capable of using the computer components.
Figure 3:
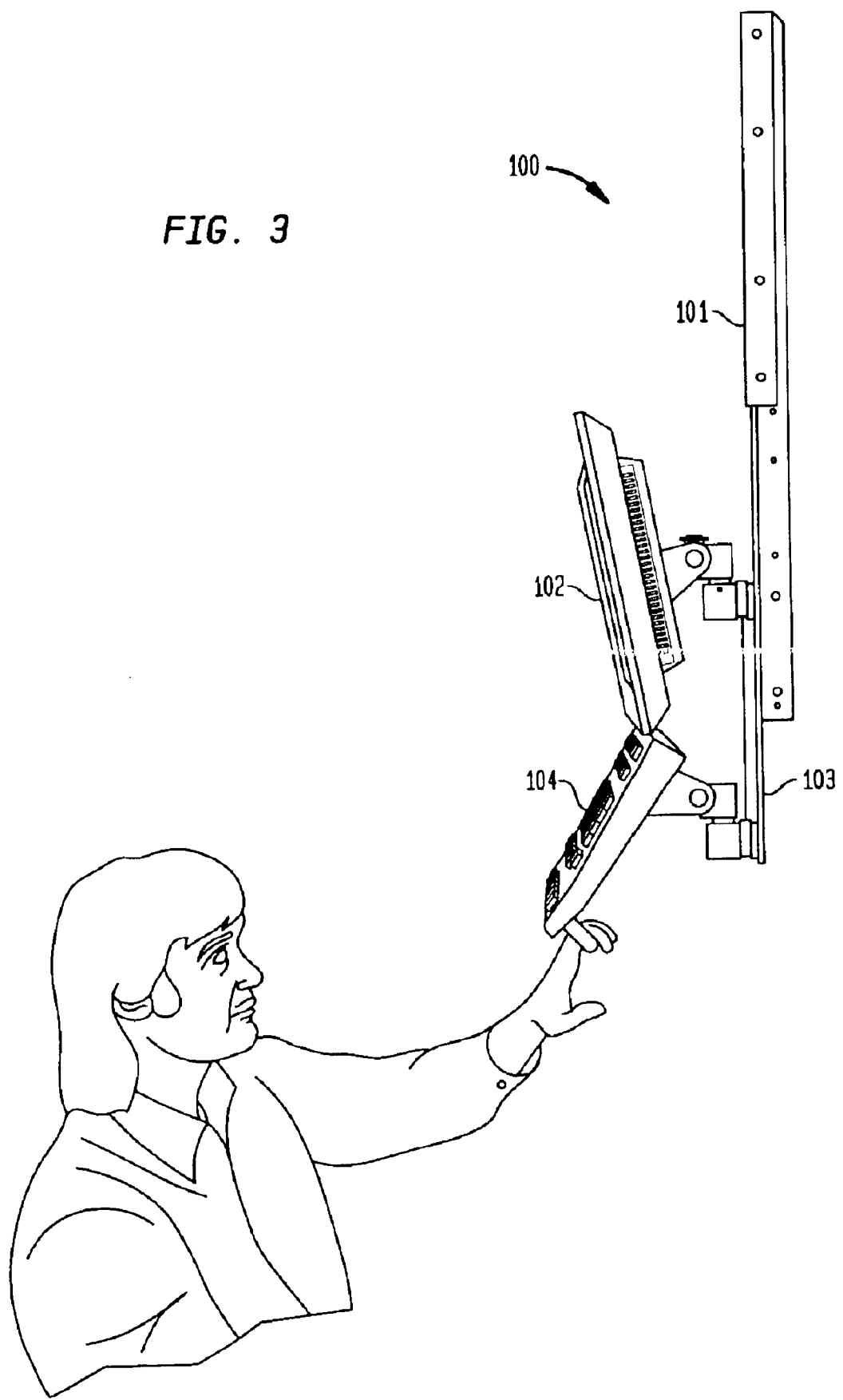
FIG. 3 is a side view depicting a user pulling the display arm into a position in which the user can use the computer components.
Figure 4:
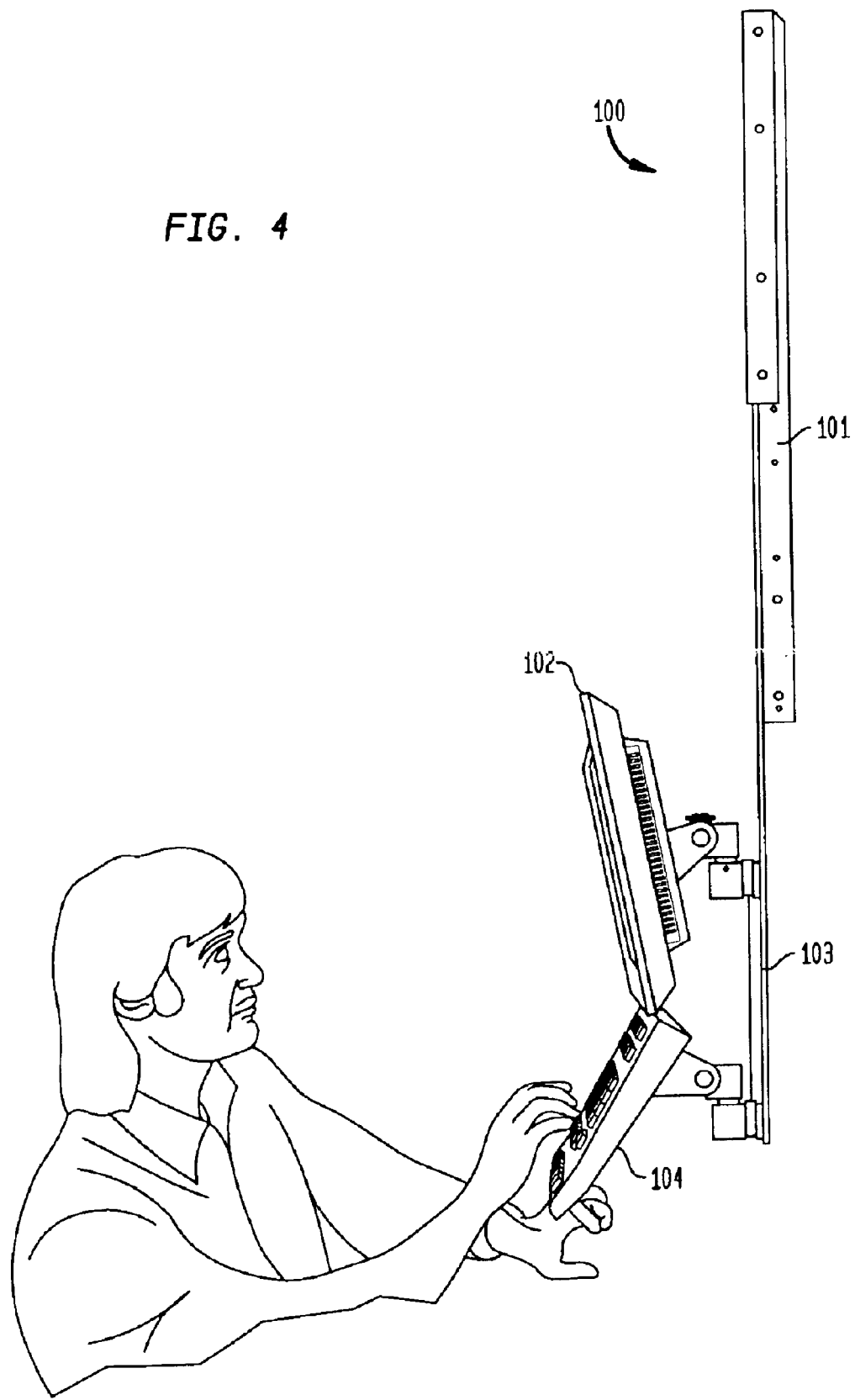
FIG. 4 is a side view of the display arm shown in FIG. 2.
Figure 5:
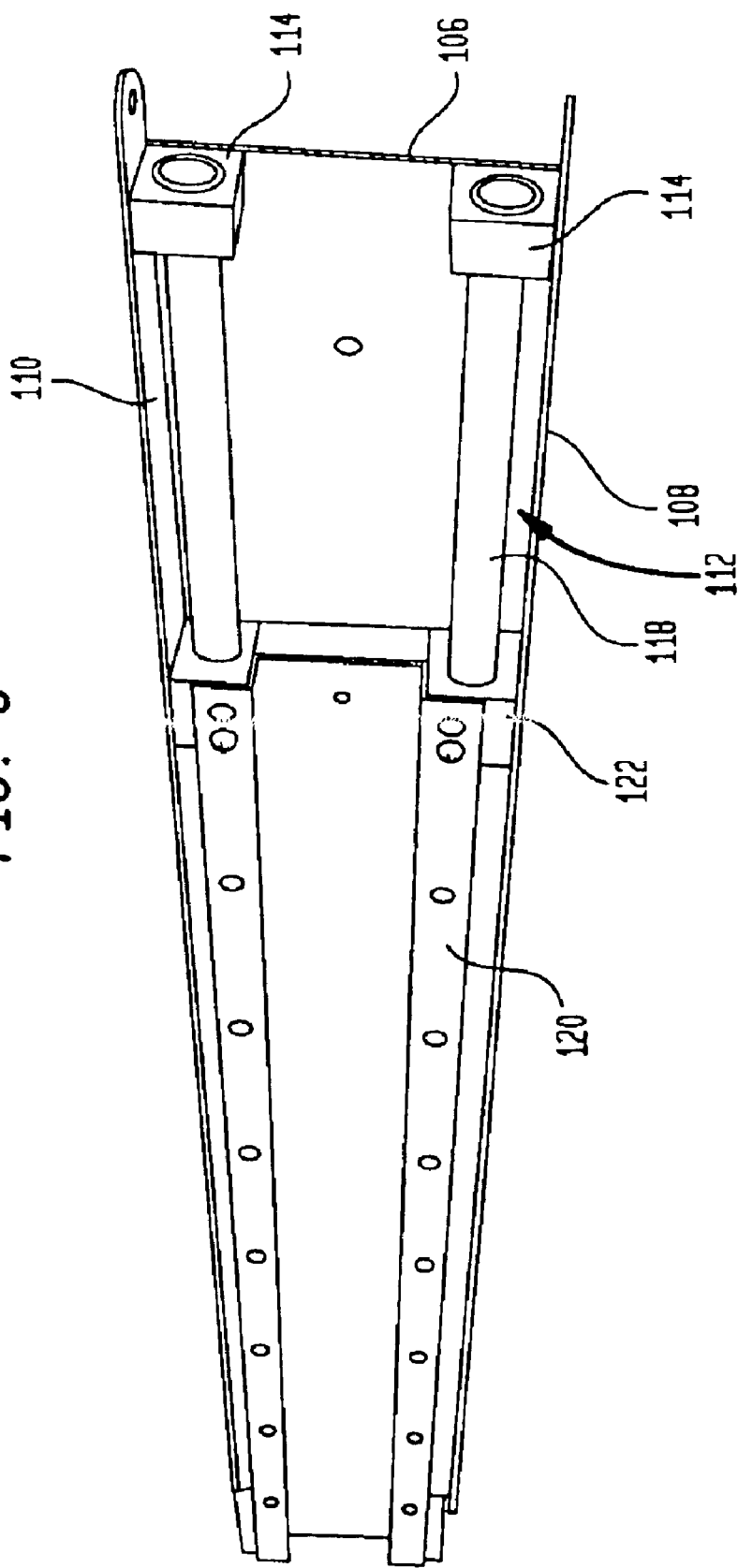
FIG. 5 is a front perspective view of a partially assembled display arm.
Figure 6:
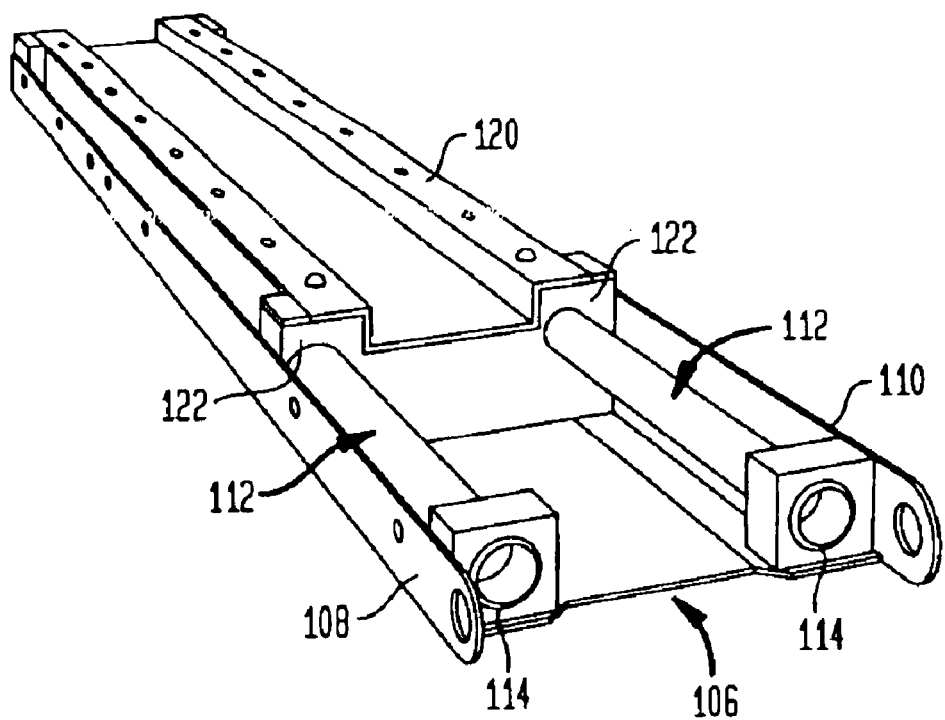
FIG. 6 is a perspective view from the top portion of a partially assembled display arm.
Figure 7:
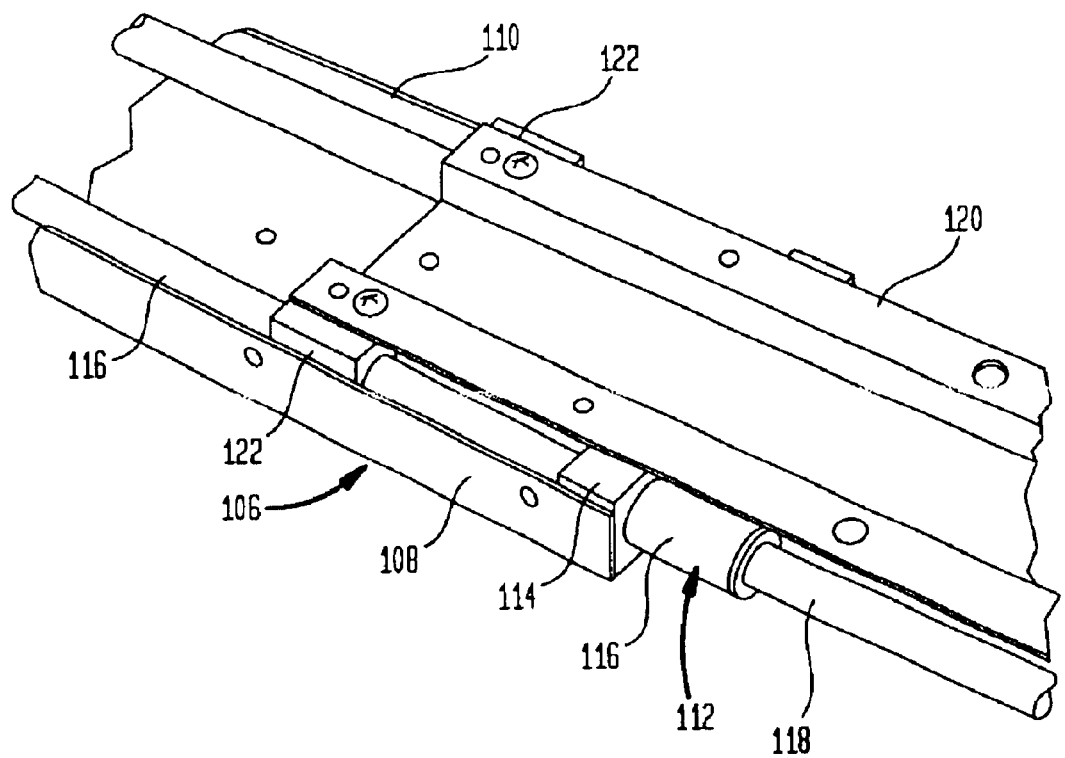
FIG. 7 is a perspective view of the telescopic mounting portion of the display arm.
Figure 10:
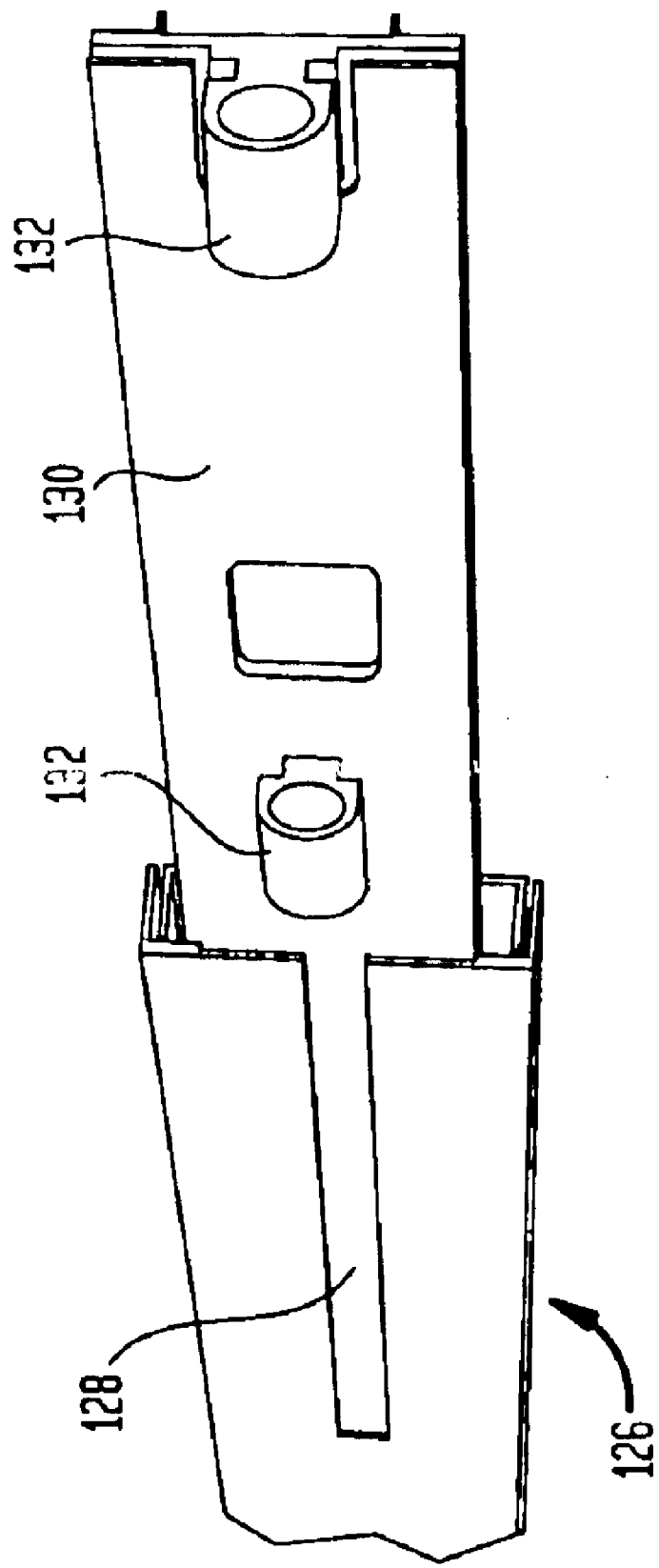
FIG. 10 is a front perspective view of the display arm in partial assembly, with the sliding arm in an extended position.

The display arm 100 is constructed to be extendable in a telescopic manner to provide variable height adjustment for the monitor 102 and keyboard 104 as shown in FIGS. 2–4. The monitor 102 and keyboard 104 can be positioned vertically at different elevations depending upon the needs of the user. This ability to position the monitor and/or keyboard at different elevations is based upon the telescopic nature of the display arm 100.

Referring to FIGS. 5–8, the display arm 100 includes an elongated U-shaped base 106 having upstanding sidewalls 108, 110. A telescopic rail 112 is supported longitudinally within the base 106 adjacent each of the sidewalls 108, 110 by means of bushings 114. The bushings 114 have an opening through which one end of the telescopic rails 112 extend, for example, see FIG. 7. In this regard, the rails 112 are telescopic in nature in that they generally comprise an outer rail 116 and a longitudinally slidable inner rail 118. By virtue of the telescopic construction of the rails 112, the rails may be extended to a variety of longitudinal lengths.

An elongated cover plate 120 is slidingly positioned over the base 106. One end of the cover plate 120 supports a pair of spaced apart bushings 122 which slidingly receive therethrough the outer rail 116. The other end of the cover plate 120 is attached via a connector 124 to the free end of the inner rail 118 as shown in FIG. 8. Based upon the foregoing construction, as the upper end of the cover plate slides along the outer rails 116, the other end of the cover plate telescopically extends the inner rail 118.

Turning to FIGS. 9–12, there is shown the display arm 100 in partial assembly. An elongated housing 126 is provided over the cover plate 120 and base 106. The housing 126 is provided with an elongated slot 128 extending from one end thereof partially along the housing. An elongated support plate 130 is attached to the cover plate 120 at the end to which the cover plate is attached to the inner rail 118. Accordingly, extension of the cover plate 120 will provide a corresponding extension or telescopic effect to the support plate 130.

Figure 11:
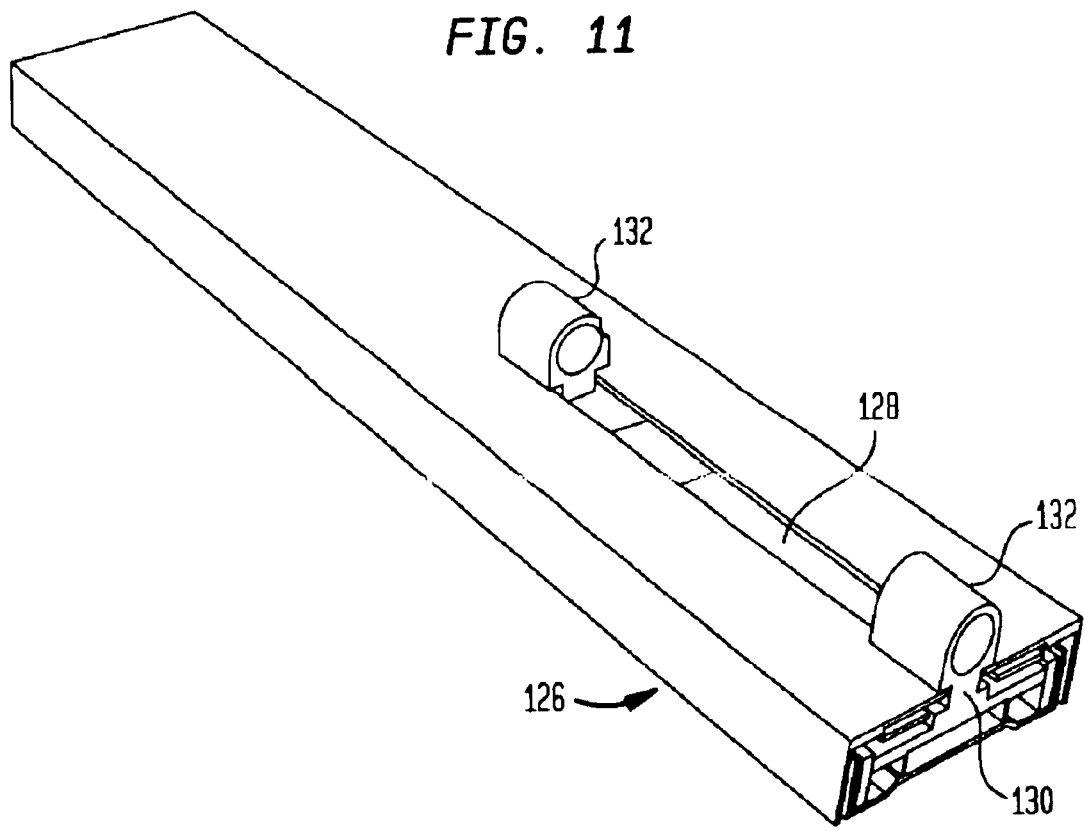
FIG. 11 is a front perspective view of the display arm in partial assembly, with the sliding arm in a retracted position.
Figure 12:
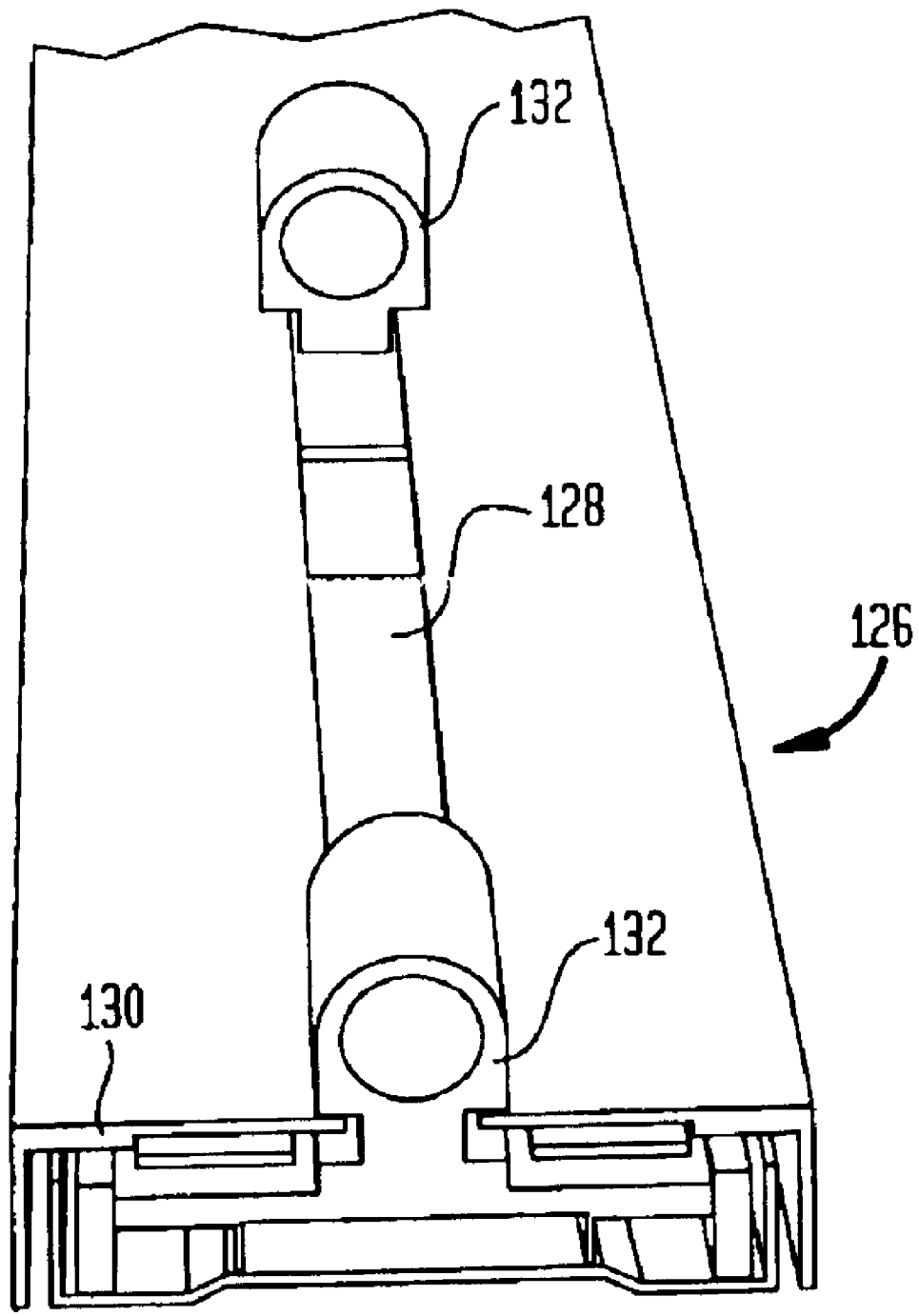
FIG. 12 is a perspective view from the bottom portion of the display arm in partial assembly, with the sliding arm in a retracted position.

A pair of spaced apart connector brackets 132 are positioned on the support plate 130. The connector brackets 132 are arranged in collinear alignment with the slot 128 so as to be received therein when the support plate 130 is telescoped into its compressed state as shown in FIG. 11. The monitor 102 and keyboard 104 may be attached directly to the connector brackets 132 as shown in FIG. 3 by any suitable assembly. Preferably, the assembly will include a cylindrical member which can be received within a cylindrical opening within the connector brackets 132. This allows the monitor or keyboard to be rotated to accommodate different angular positions.

Figure 14:
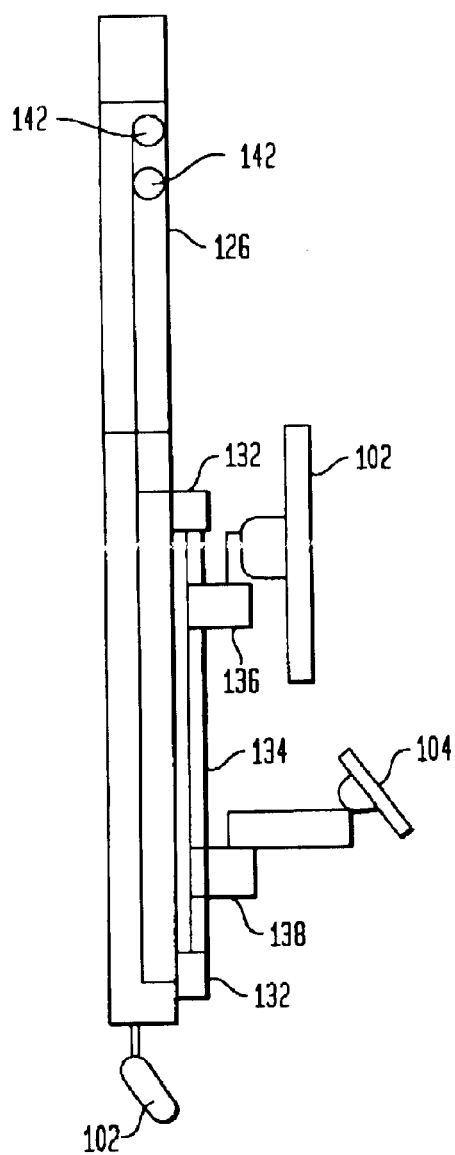
FIG. 14 is a side view of the display arm in complete assembly, with the sliding arm in a retracted position.

In another arrangement as shown in FIGS. 13 and 14, a rod 134 is attached between the connector brackets 132. The monitor 102 is attached to the rod by means of a slidable assembly 136. Similarly, the keyboard 104 is connected to the rod 134 by slidable assembly 138. The slidable assemblies may be of known construction which allow the assemblies to slide along the rod 134 while being securable at a fixed location using, for example, a set screw, thumb screw and the like. The monitor and keyboard are mounted to the slide assemblies as previously described to allow for their rotation. Based upon this construction, the monitor and keyboard can be individually height adjusted along the length of the rod 134. By way of one example, the slidable assemblies 136, 138 may comprise articulatable arms 140.

Figure 15:
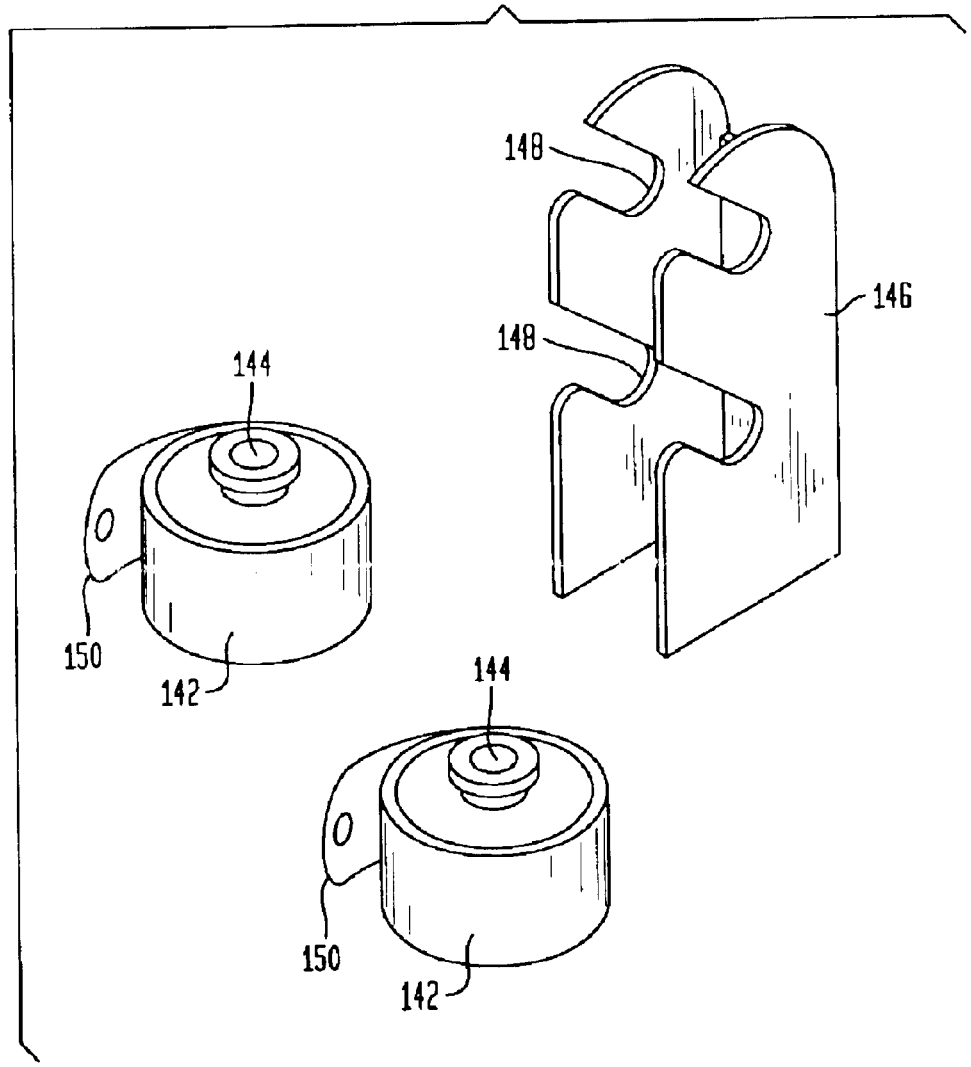
FIG. 15 is a perspective view of the spring counterbalancing assembly in an unassembled state.
Figure 16:
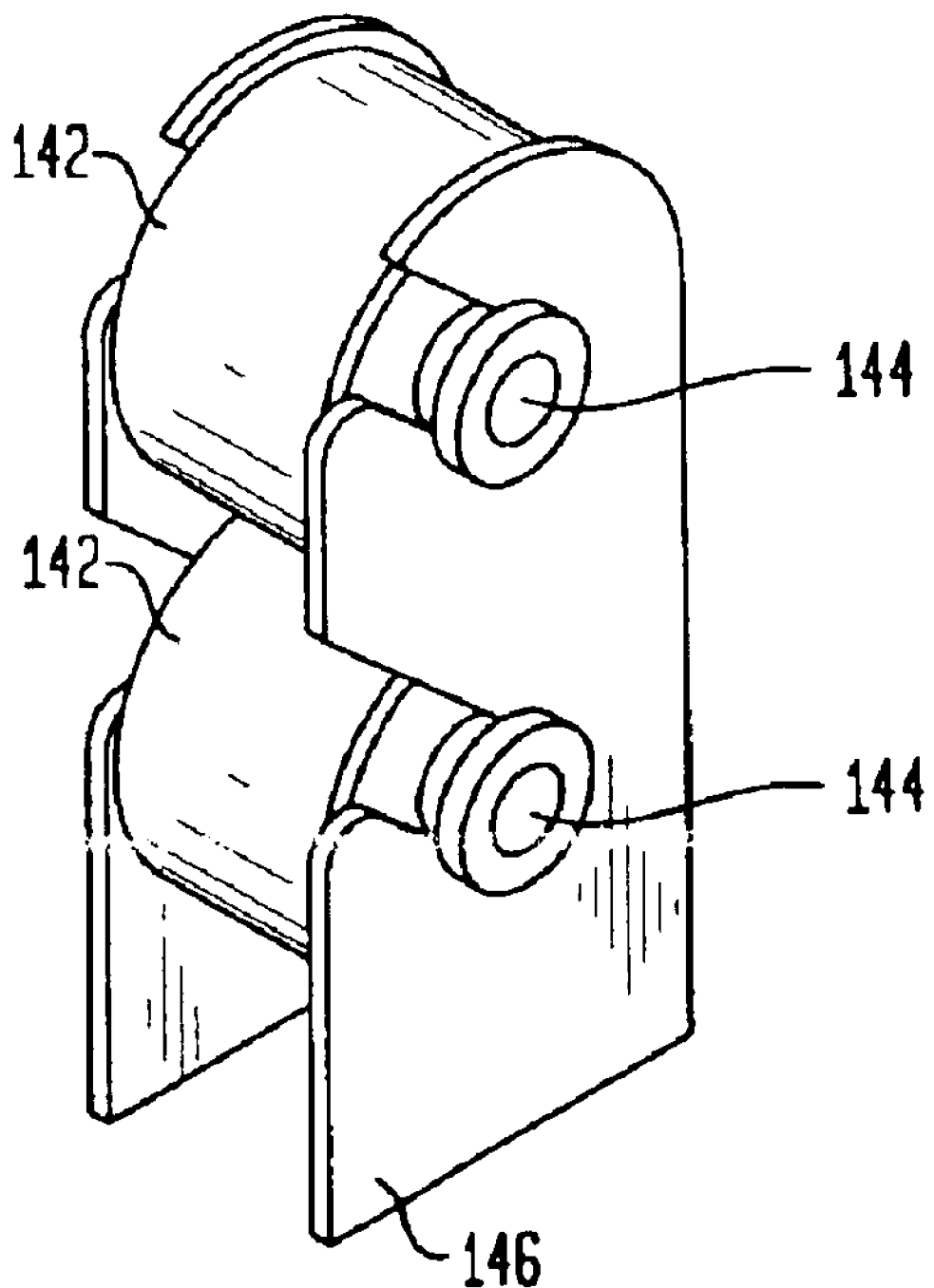
FIG. 16 is a perspective view of the spring counterbalancing assembly in an assembled state.

Referring now to FIGS. 15–18, there will be described a counterbalancing assembly. The counterbalancing assembly functions as a counterweight using a constant force spring to compensate for the weight of the telescopic components of the display arm and the weight of the computer components supported thereby. The counterbalancing assembly is in the nature of a Negator spring which is well known in the art and available from a number of commercial sources. The Negator spring is generally a coiled flat spring 142 supported about a shaft 144 as shown in FIGS. 15 and 16. As shown, the counterbalancing assembly is constructed from a pair of springs 142. The number, size and counterbalancing effect of the springs can be varied depending upon the nature of the display arm 100 and the weight of the devices to be supported. The particular selection and technical requirements for the spring 142 are known to those skilled in the art.

Figure 19:
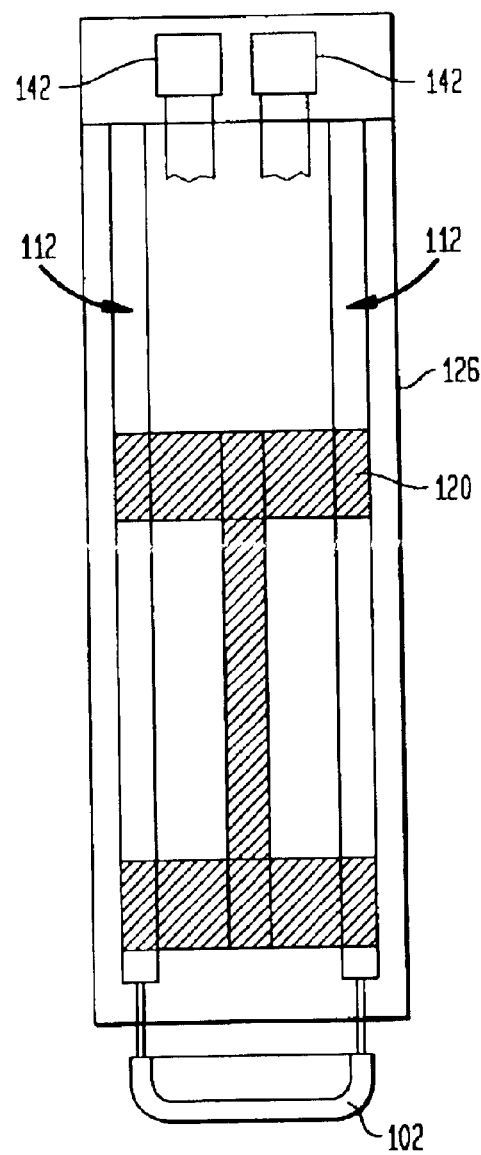
FIG. 19 is a front view of the display arm in complete assembly, with the sliding arm in a retracted position.
Figure 21:
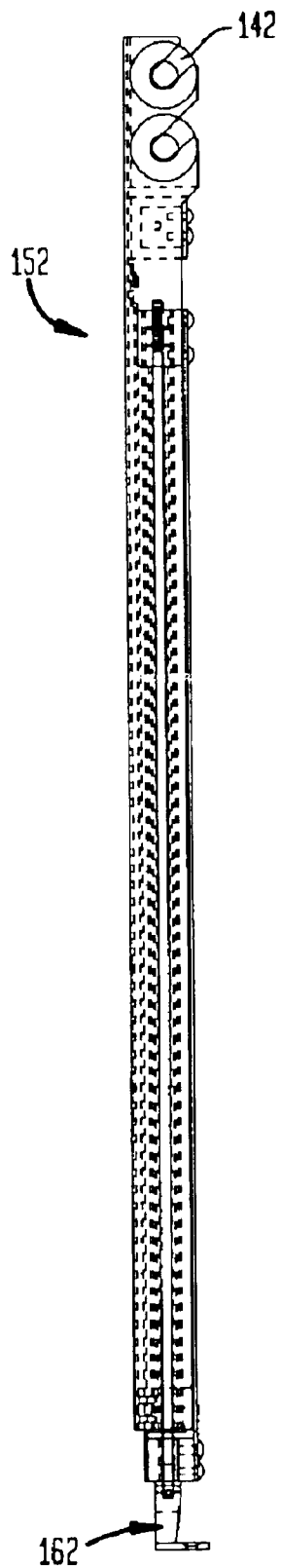
FIG. 21 is a side view of the display arm in complete assembly.
Figure 22:
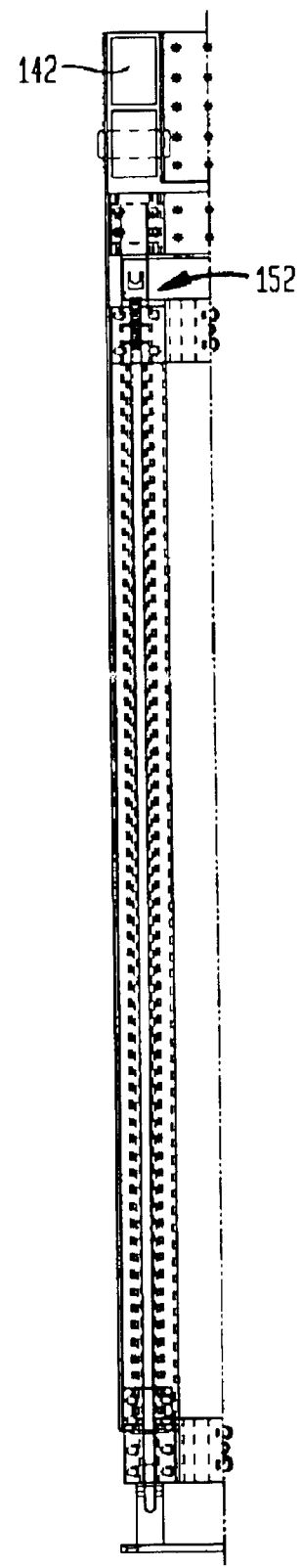
FIG. 22 is a partial front view of the display arm in complete assembly.

In the embodiment illustrated, two springs 142 are supported by their shafts 144 within a bracket 146. The bracket 146 has a pair of spaced apart sloping slots 148 which receive the free ends of the shafts 144 as shown in FIG. 16. As shown in FIGS. 17 and 18, the bracket 146 is mounted to one end of the base 106. The free end of the springs 150 are attached to the cover plate 120 by any suitable device. As shown in FIGS. 14 and 18, the springs 142 are arranged in collinear alignment one above the other pursuant to one embodiment of the present invention. In FIGS. 2 and 19, the springs 142 are arranged in side-by-side relationship at one end of the housing 126. Accordingly, it should be appreciated that any number of Negator springs may be used for counterbalancing the weight of the telescoping components of the display arm and the supporter devices. The assembled form of the display arm 100 is shown generally in FIGS. 13 and 20, and more specifically with reference to the spring 142 in FIGS. 21–22.

Figure 27:
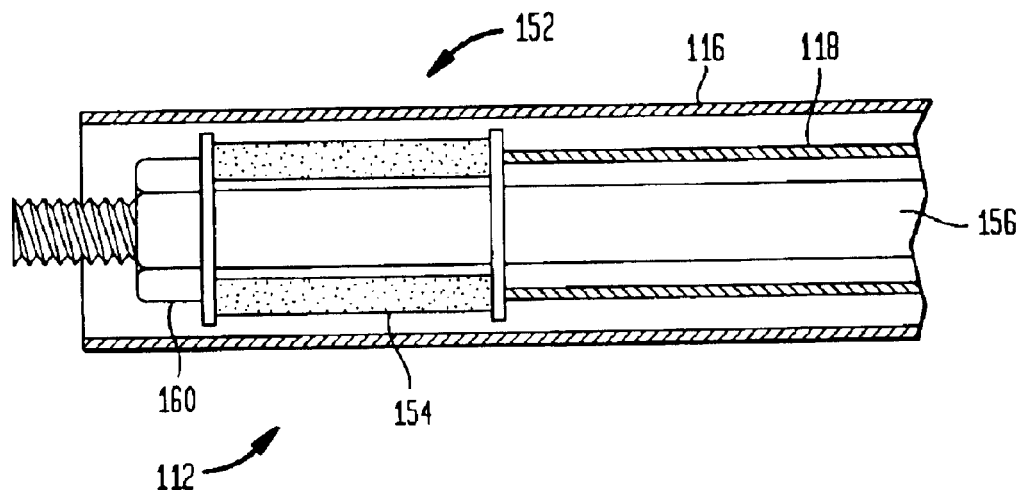
FIG. 27 is a front view of the locking mechanism in an unlocked position.

Referring to FIGS. 23–31, a locking mechanism 152 is provided to maintain the display arm in its extended state at a predetermined position. The locking mechanism 152 is inserted interiorally within one or both of the rails 112. In the preferred embodiment, a locking mechanism 152 will be provided within each of the rails 112. The locking mechanism 152 includes a compression ring 154 of compressible elastomeric material such as a rubber ring and the like. The rubber ring is received within the outer rail 116 at the upper end thereof. An elongated threaded rod 156 is inserted through the ring 154 extending longitudinally through the interior of the inner rail 118. One end of the rod 156 is secured to the ring 154 by means of either an enlarged head 158 as shown in FIG. 26 or by means of a nut 160 as shown in FIG. 27. The ring 158 is thereby captured between the head 158 or nut 160 and the upper end of the inner rail 118. The other end of the rod 156 is attached to a pivotable handle 162. The handle 162 via a coupled cam mechanism (See FIGS. 23 and 24) is operable for pulling the rod 156 longitudinally within the rail 112.

Figure 28:
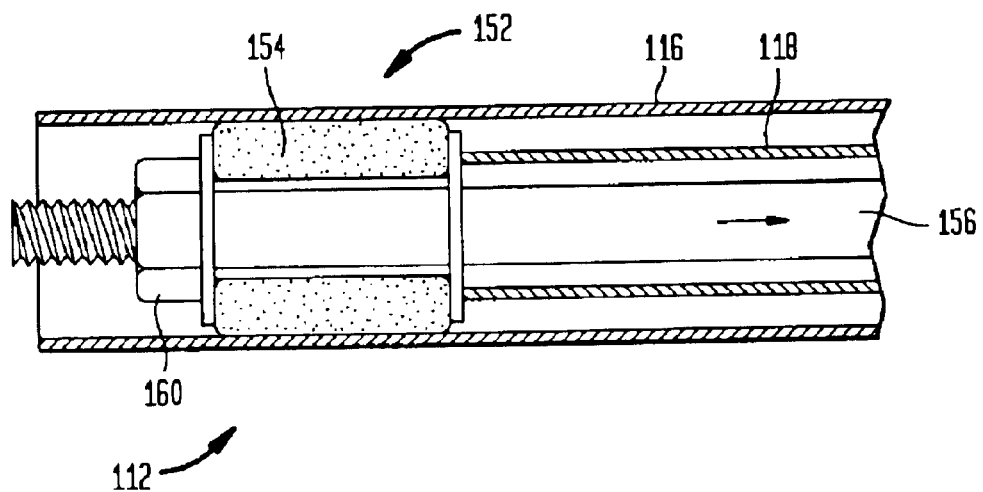
FIG. 28 is a front view of the locking mechanism in a locked position.
Figure 29:
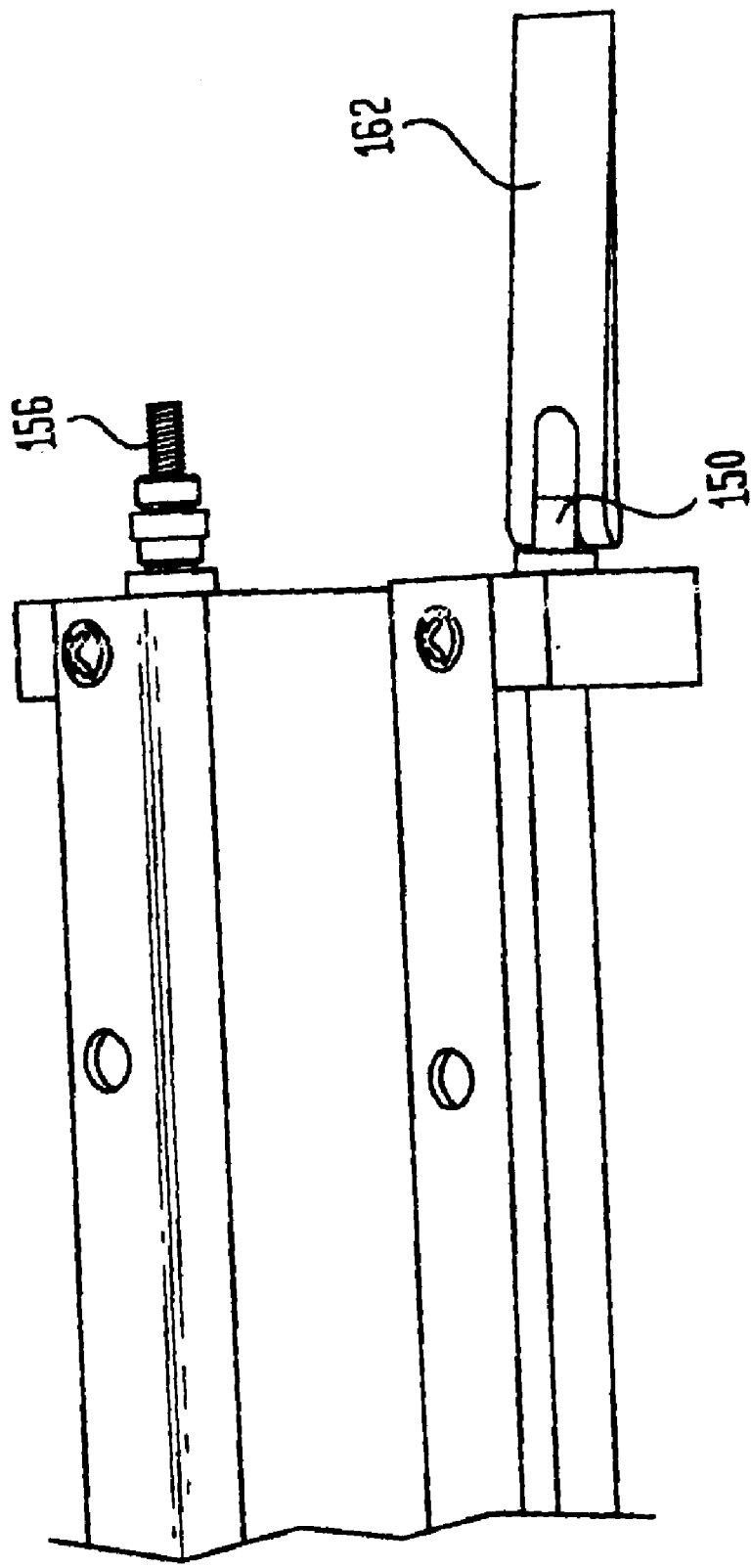
FIG. 29 is a perspective view of the locking mechanism handle connected to the display arm.
Figure 31:
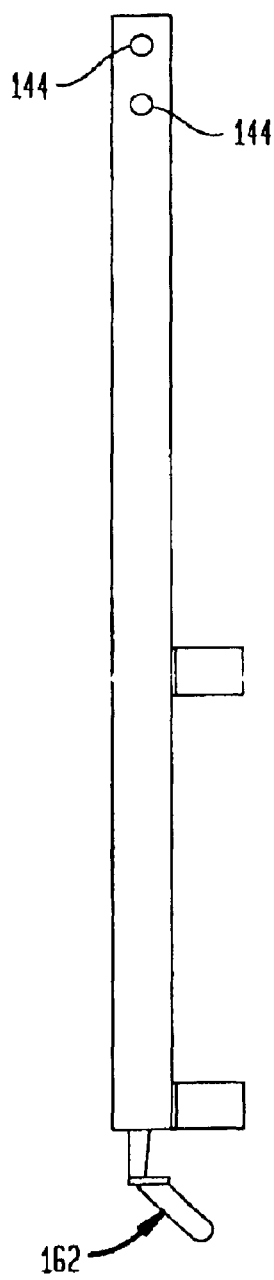
FIG. 31 is a side view of the display arm showing the locking mechanism.
Figure 30:
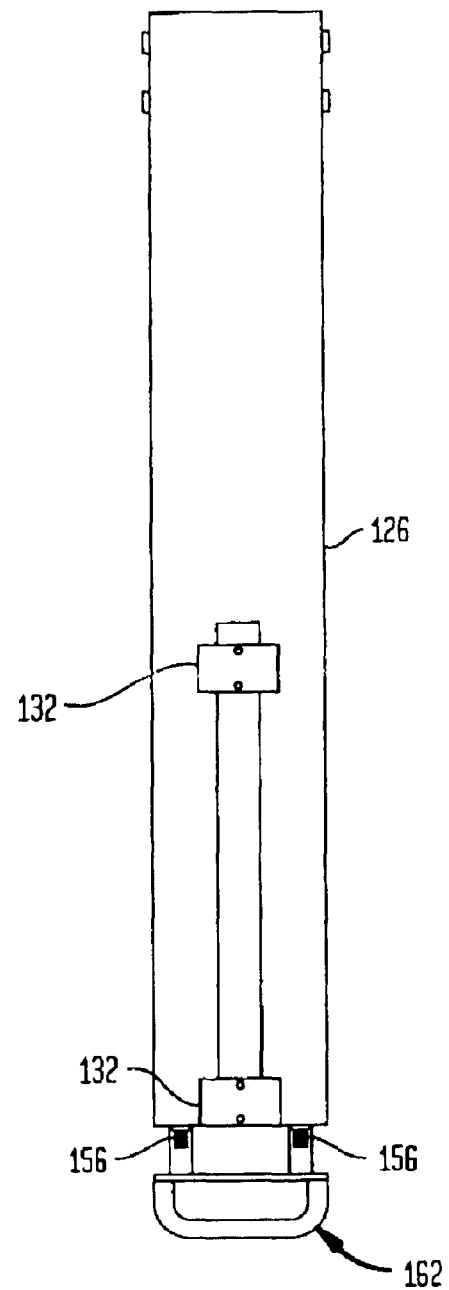
FIG. 30 is a front view of the display arm showing the locking mechanism.
Figure 32:
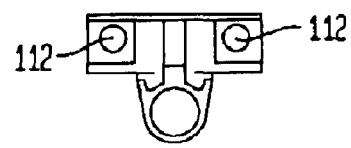
FIG. 32 is a top view of the display arm as shown in FIG. 30.

When the locking mechanism 152 is in its unlocked state, as shown in FIG. 27, the ring 154 is displaced from the internal sidewall of the outer rail 116. In this condition, the inner rail 118 may be slid longitudinally therealong to provide vertical height adjustment. Upon rotation of the handle 162, the rod 156 is pulled longitudinally through the inner rail 118 via the cam mechanism compressing the ring 154 against the end of the inner tube thereby expanding the ring 154 as shown in FIG. 28. The expansion of the ring 154 causes the ring to engage the inner surface of the outer rail 116 thereby locking the inner rail from further movement. The ring 154, as shown in FIGS. 27 and 28, may be supported between a pair of spaced apart washers whose diameter is less than that of the inner diameter of the outer rail 116.

From the foregoing construction of the display arm 100, monitor 102 and/or keyboard 104 may be positioned at a vertical height as desired by the user. When in the storage position as shown in FIG. 1, the display arm 100 is in its collapsed state maintaining the monitor and keyboard at an elevated position. This position is sustained by the counterbalancing effect of the springs 142. The monitor and keyboard may be displaced downwardly by telescoping the display arm upon application of a downward force to overcome the spring force. The cover plate 120 is guided by the lateral rails 112 which telescope to accommodate the extension of the display arm. The display arm may be locked into a fixed position by the locking mechanism 152 by manipulation of the handle 162 as previously described. The display arm may be collapsed into a storage position by further manipulation of the handle to release the locking mechanism. By application of a slight upward force, the display arm may be collapsed into its storage position as facilitated by the counterbalancing effect of the springs.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An adjustable display arm for positioning an electronic component in a plurality of vertical positions, said display arm comprising a mounting portion adapted to be supported in a vertical orientation; a sliding arm moveably mounted to said mounting portion for movement in a vertical direction between a plurality of vertical positions, said sliding arm moveable in an upward direction upon application of an upward force thereto and in a downward direction upon application of a downward force thereto, said sliding arm being maintained in said plurality of vertical positions in the absence of either said upward force or said downward force; and first and second spaced apart telescopic assemblies attached to said mounting portion, each of said telescopic assemblies including a first elongated tubular member telescopically received within a second elongated tubular member, said second elongated tubular member being attached to said mounting portion and said first elongated tubular member being attached to said sliding arm.

2. The adjustable display arm as claimed in claim 1, further comprising a counterbalance assembly, wherein said counterbalancing assembly maintains said sliding arm in said plurality of vertical positions in the absence of either said upward force or said downward force.

3. The adjustable display arm as claimed in claim 2, wherein said counterbalancing assembly comprises a spring having a spring force, said spring being connected at one end to said mounting portion and at another end to said sliding arm.

4. The adjustable display arm as claimed in claim 3, wherein said spring comprises a coiled spring.

5. The adjustable display arm as claimed in claim 1, wherein said sliding arm includes first and second opposing ends, said first elongated tubular member being fixedly attached to said first end of said sliding arm, and said second end of said sliding arm being slidingly coupled to said second elongated tubular member.

6. The adjustable display arm as claimed in claim 1, further comprising attachment means for movably attaching at least one electronic component to said sliding arm.

7. The adjustable display arm as claimed in claim 6, further including a computer monitor and a computer keyboard attached to said sliding arm by said attachment means.

8. The adjustable display arm as claimed in claim 6, wherein said attachment means comprises a cylindrical member having opposite ends connected to a respective one of a pair of spaced apart brackets attached to said sliding arm, wherein said electronic component is coupled to said cylindrical member.

9. An adjustable display arm for positioning an electronic component in a plurality of vertical positions, said display arm comprising a mounting portion adapted to be supported in a vertical orientation; a sliding arm moveably mounted to said mounting portion for movement in a vertical direction between a plurality of vertical positions, said sliding arm moveable in an upward direction upon application of an upward force thereto and in a downward direction upon application of a downward force thereto; first and second spaced apart telescopic assemblies attached to said mounting portion, each of said telescopic assemblies including a first elongated tubular member telescopically received within a second elongated tubular member, said second elongated tubular member being attached to said mounting portion and said first elongated tubular member being attached to said sliding arm; and a counterbalancing assembly operative to maintain said sliding arm in said plurality of vertical positions in the absence of either said upward force or said downward force.

10. The adjustable display arm as claimed in claim 9, wherein said counterbalancing assembly comprises a spring having a spring force, said spring being connected at one end to said mounting portion and at another end to said sliding arm.

11. The adjustable display arm as claimed in claim 10, wherein said spring comprises a coiled spring.

12. The adjustable display arm as claimed in claim 9, wherein said sliding arm includes first and second opposing ends, said first elongated tubular member being fixedly attached to said first end of said sliding arm, and said second end of said sliding arm being slidingly coupled to said second elongated tubular member.

13. The adjustable display arm as claimed in claim 9, further comprising an attachment assembly for movably attaching at least one electronic component to said sliding arm.

14. The adjustable display arm as claimed in claim 13, further including a computer monitor and a computer keyboard attached to said sliding arm by said attachment means.

15. The adjustable display arm as claimed in claim 13, wherein said attachment means comprises a cylindrical member having opposite ends connected to a respective one of a pair of spaced apart brackets attached to said sliding arm, wherein said electronic component is moveably coupled to said cylindrical member between said brackets.

16. An adjustable display arm for positioning an electronic component in a plurality of vertical positions, said display arm comprising a mounting device adapted to be supported in a vertical orientation; a sliding arm having first and second opposing ends moveably mounted to said mounting device for movement in a vertical direction between a plurality of vertical positions, said sliding arm moveable in an upward direction upon application of an upward force thereto and in a downward direction upon application of a downward force thereto; first and second spaced apart telescopic assemblies attached to said mounting device, each of said telescopic assemblies including a first elongated tubular member telescopically received within a second elongated tubular member, said second elongated tubular member being attached to said mounting device and said first elongated tubular member being attached to said sliding arm, said first elongated tubular member being fixedly attached to said first end of said sliding arm and said second end of said sliding arm being slidingly coupled to said second elongated tubular member; a counterbalancing assembly operative to maintain said sliding arm in said plurality of vertical positions in the absence of either said upward force or said downward force, said counterbalancing assembly comprising a coiled spring having a spring force, said spring being connected at one end to said mounting device and at another end to said sliding arm; and an attachment adapted to movably secure a computer monitor and a computer keyboard to said sliding arm, said attachment comprises a cylindrical member having opposite ends connected to a respective one of a pair of spaced apart brackets attached to said sliding arm, wherein said computer monitor and said computer keyboard are attachable to said cylindrical member.

17. A method of positioning an electronic component in a plurality of vertical positions, said method comprising supporting a mounting device in a vertical orientation; movably coupling a sliding arm to said mounting device for movement in a vertical direction between a plurality of vertical positions, said sliding arm moveable in an upward direction upon application of an upward force thereto and in a downward direction upon application of a downward force thereto; coupling a counterbalance assembly between said mounting device and said sliding arm; maintaining said sliding arm in said plurality of vertical positions in the absence of either said upward force or said downward force; releasably locking said sliding arm in at least one of said plurality of vertical positions; and attaching said sliding arm to a telescopic assembly comprising first and second elongated tubular members telescopically nested together.

18. The method as claimed in claim 17, wherein said counterbalance assembly comprises a coiled spring.

19. The method as claimed in claim 18, further including selecting said spring to have a spring force whereby said sliding arm remains in said plurality of vertical positions in the absence of either said upward force or said downward force.

20. The method of claim 18, further including attaching said spring between said mounting device and said sliding arm.

21. A method of positioning an electronic component in a plurality of vertical positions, said method comprising supporting a mounting device in a vertical orientation; attaching a pair of spaced apart telescopically assemblies to said mounting device; movably coupling a sliding arm to said telescopically assemblies for movement in a vertical direction between a plurality of vertical positions; coupling a counterbalance assembly between said mounting device and said sliding arm for maintaining the sliding arm in the plurality of vertical positions, wherein said sliding arm is moveable in an upward direction upon application of an upward force thereto in and in a downward direction upon application of a downward force thereto; and releasably locking said sliding arm in a plurality of vertical positions.

22. The method as claimed in claim 21, wherein said counterbalance assembly comprises a coiled spring.

23. The method as claimed in claim 22, further including selecting said spring to have a spring force whereby said sliding arm remains in said plurality of vertical positions in the absence of either said upward force or said downward force.

* * * * *